Patented Nov. 13, 1934

1,980,763

UNITED STATES PATENT OFFICE 1,980,763

DUST EXHAUSTING APPARATUS

Otto Schreiber, Neunkirchen, Kreis Siegen, Germany

Application April 20, 1932, Serial No. 606,399½
In Germany April 24, 1931

8 Claims. (Cl. 183—8)

The present invention relates to apparatus for exhausting and trapping loose dust in connection with boring operations in mines and elsewhere. It is well known that in this type of apparatus flowing water is used to trap the dust and as a result the moistened dust congeals and frequently prevents the dust from being properly exhausted and trapped. An object of this invention is to provide improvements in such apparatus which will ensure the dust being effectively carried to a predetermined delivery zone without-risk of such congealing. Another object of this invention is to separate the coarser particles of the dust from the finer particles so that the coarser particles will not clog the mechanism which is employed for moistening and delivering the finer particles to the desired source.

The invention will be understood by reference to the accompanying drawings in which Fig. 1 is a vertical centre section of the dust exhausting apparatus;

Fig. 3 is a sectional plan view taken on the line C—D of Figure 1.

Fig. 6 is a fragmentary view showing the means for automatically discharging the larger particles from the appropriate conduit.

Figure 1:
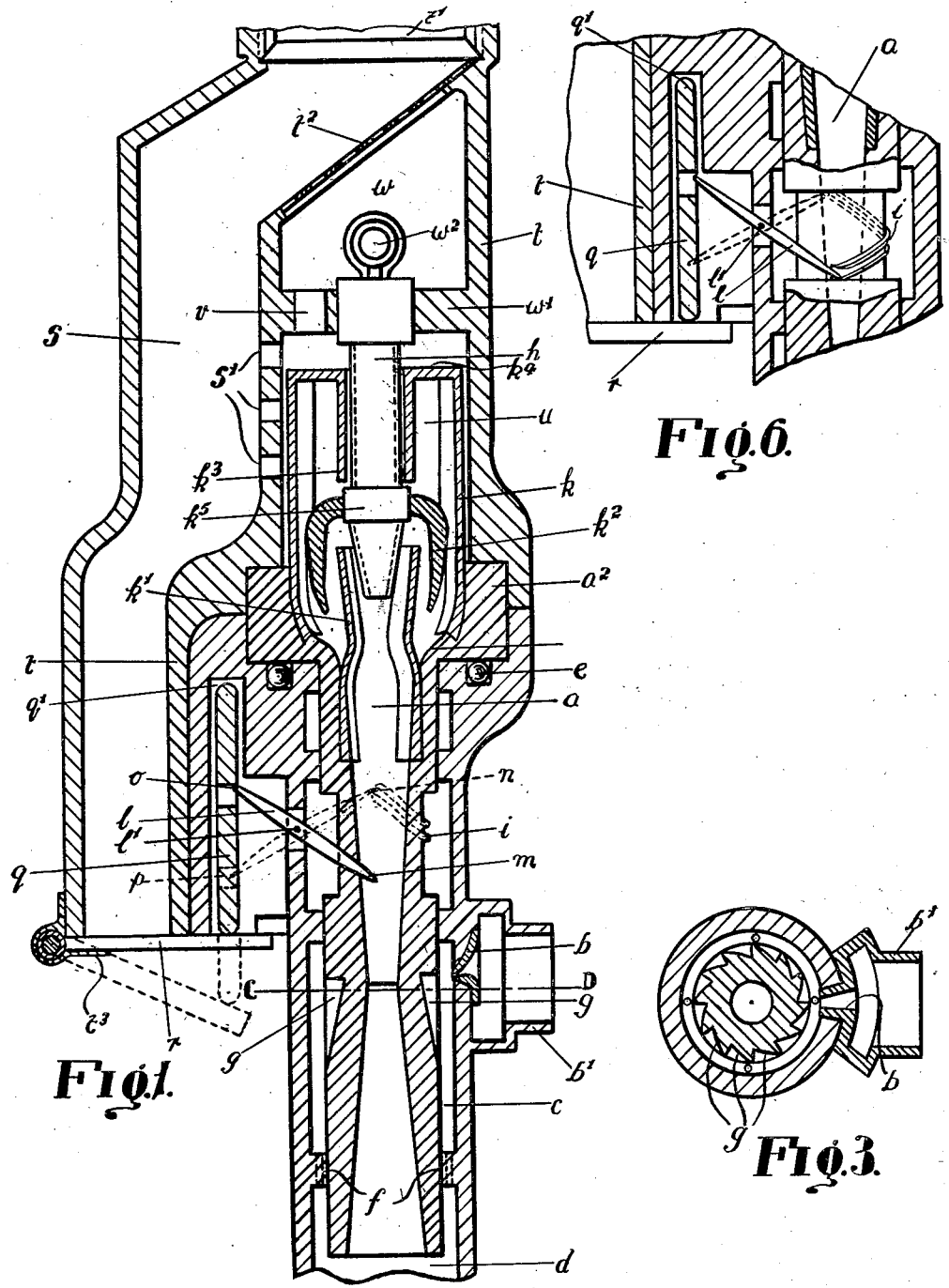
Figure 2:
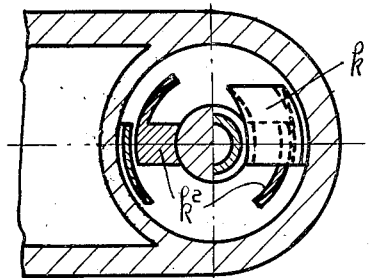
Fig. 2 is a broken sectional plan view to a larger scale taken on the line A—B of Figure 4.
Figure 4:
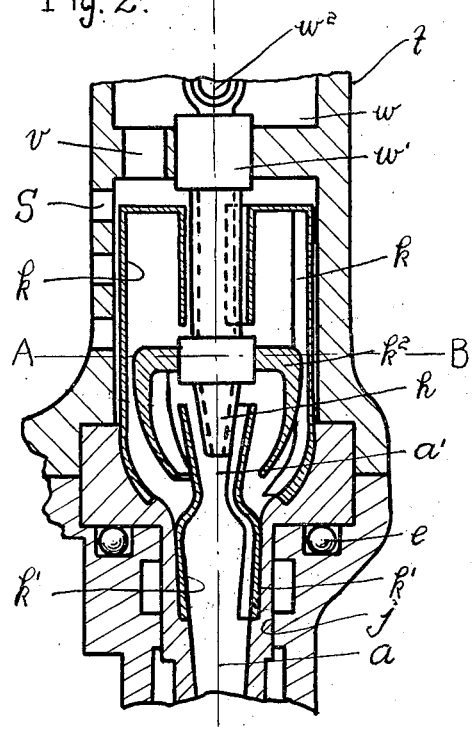
Fig. 4 is a broken sectional elevation showing the configuration and arrangement of the scrapers.
Figure 5:
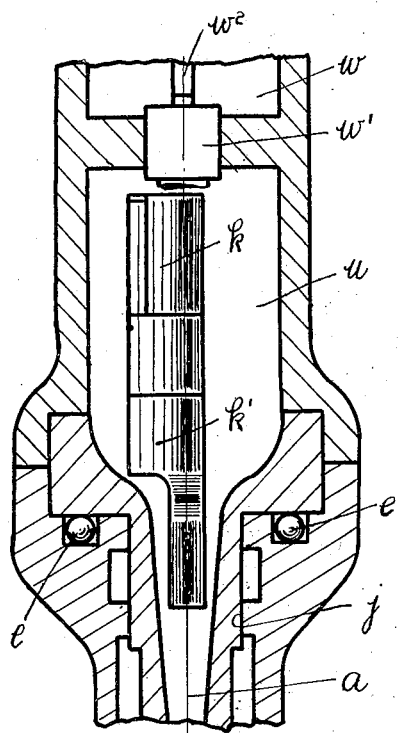
Fig. 5 is a sectional elevation taken at right angles to Fig. 4 with the centre nozzle and its pipe broken away to expose the scrapers.

Referring to the drawings, the apparatus shown is formed with a flanged conduit $t'$ open at its upper and lower ends and adapted at its upper end to be bolted or otherwise secured to a transverse conduit or cap containing the boring tool so that the particles of dust fall or are drawn into the conduit $t'$. The conduit $t'$ is secured at its lower end to a body part $t$ containing an inclined sieve $t^2$ which is fixed stationarily within the body above a chamber $w$, in the centre of the base $w'$ of which is fitted a water supply pipe $w^2$ from which depends a nozzle $h$ extending into a lower chamber $u$ hereinafter referred to. One or more openings $v$ is or are formed in the base $w'$ of the chamber $w$ for the emission of fine particles of dust from such chamber $w$ into the chamber $u$. The coarser particles of dust fall off the inclined sieve $t^2$ into a uni-lateral depending conduit S which has apertures $S'$ in its side through which fine particles of dust can be drawn into the chamber $u$.

The nozzle $h$ discharges concentrically into a flared or Venturi tube like upper end $a'$ of a guide nozzle $a$ formed with a flanged enlargement $a^2$ supported for rotation on ball bearings $e$, the guide nozzle $a$ being adapted to be rotated about a vertical axis. This rotation is effected by a liquid under pressure which is projected through a nozzle $b$ against the sides of helically shaped channels $g$ formed in the lower end of the guide nozzle $a$. A lateral pipe coupling $b'$ receives the pipe which conveys water to the nozzle $b$. The liquid then flows through the space $c$ away axially, and combines with the depositing liquid from the nozzle $h$ at the point $d$. The guide nozzle $a$ rotates continuously in the guide surfaces $f$. To remove any boring sludge produced in the space $u$, scrapers $k$, $k'$ and $k^2$ are provided, the scrapers $k$ and $k'$ are fixed on the guide nozzle $a$, and move in the direction of rotation of the guide nozzle $a$ in order to carry helically the boring sludge adhering to the walls of said chamber $u$ to the zone immediately beneath the depositing nozzle $h$. The scrapers $k^2$ are fixed on the liquid supply pipe of the nozzle $h$, which is stationary, the arrangement being that boring sludge collected on the scrapers $k$ contacts against the scrapers $k^2$ and is thereby released. The scrapers $k'$ are arcuate section plates fixed at their lower ends into the conical upper end of the nozzle $a$ and extend upwardly about the nozzle $h$ and scrape off any sludge adhering to the nozzle $h$, it being apparent that the scrapers need not necessarily contact directly against the nozzle $h$.

The scrapers $k$ are arcuate section vertical strips fixedly secured at their lower ends into a flared part $a'$ of the nozzle $a$ and bent laterally inwards at their upper ends as at $k^4$ into the integral depending scrapers $k^3$, which rotate about and scrape off sludge adhering to the liquid supply pipe of the nozzle $h$. The scrapers $k^2$ depend from integral radial portions fixed to a collar $k^5$ fixed to the nozzle $h$ and are curved downwardly. The deposit removed by the scrapers is directed inwardly downwards to ensure it being washed downwards by the water from the nozzle $h$.

This rotation of the guide nozzle has, however, still another task to fulfill. As will be seen from Figs. 1 and 6 there is arranged on the jacket of the guide nozzle $a$, a helically shaped projection $i$. Furthermore, there is between the guide nozzle $a$ and the conduit S, a lever rod $l$ rotatable about a pin $l'$, and a pin $q$, located in a recess $q'$ formed near the lower left hand side of the body $t$ near the lower end of the conduit S as shown in Figs. 1 and 6. This lever rod $l$ engages with one end in a groove of the pin $q$, and engages with the other with the helically shaped projection $i$ and acts by its positive movement on the rotation of the guide nozzle $a$, to open the flap $r$ by means of the pin $q$. If the rotation of the guide nozzle $a$ takes place in the example shown in clockwise direction, then the helically shaped projection $i$ raises the lower end of the lever $l$ towards the point $n$. This has a result that the lever end $o$ which is carried in the groove of the pin $q$ forces this pin $q$ downward to the point $p$ by the amount $o$—$p$ and thereby opens the flap $r$ and empties the conduit filled with coarse dust.

The closing of the flap takes place when the end of the lever $l$, which on the further rotation of the guide nozzle extends past the upper point of the helically shaped projection 2 and drops towards the point $m$ as shown in Fig. 1. This fall is promoted by the pressure which the spring $t^3$ exerts on the flap $r$, the pin $q$ and with it also on the lever $l$.

An automatic separation of coarse dust and fine dust and their extraction and immediate deposit are thereby attained.

What I claim is:—

1. In dust exhausting apparatus for use with boring machines an upper dust receiving chamber, a further chamber located beneath said upper chamber and communicating therewith, a conduit adapted to connect said upper chamber to a boring machine, a nozzle depending axially into the lower of said chambers and ejecting liquid therein, a rotatable guide nozzle in the base of and depending from the said lower chamber, and a number of scrapers located within said lower chamber adapted to remove dust adhering thereto.

2. In dust exhausting apparatus for use with boring machines an upper dust receiving chamber, a lower dust and liquid receiving chamber, a conduit connecting said upper chamber to the boring machine and a passage connecting it to said lower chamber, a nozzle for delivering liquid through said lower chamber for conveying the dust to a delivery zone, a further nozzle coaxial with and into which said liquid delivery nozzle delivers its liquid, means for rotating said further nozzle, and a scraper carried by said rotating nozzle and adapted to scrape dust from said lower chamber.

3. In dust exhausting apparatus for use with boring machines an upper dust receiving chamber, a lower dust and liquid receiving chamber, a conduit connecting said upper chamber to the boring macine and a passage connecting it to said lower chamber, a nozzle for delivering liquid through said lower chamber for conveying the dust to a delivery zone, a further nozzle coaxial with and into which said liquid delivery nozzle delivers its liquid, liquid pressure operated means for rotating said further nozzle, and a scraper carried by said rotating nozzle and adapted to scrape dust from said lower dust receiving chamber.

4. In dust exhausting apparatus for use with boring machines an upper dust receiving chamber, a lower dust and liquid receiving chamber, a conduit connecting said upper chamber to the boring machine and a passage connecting it to said lower chamber, a nozzle for delivering liquid through said lower chamber for conveying the dust to a delivery zone, a further nozzle coaxial with and into which said liquid delivery nozzle delivers its liquid, liquid pressure operated means for rotating said further nozzle and scrapers carried by said rotating nozzle for removing dust from the outer surface of the liquid delivery nozzle.

5. In dust exhausting apparatus for use with boring machines an upper dust receiving chamber, a lower dust and liquid receiving chamber, a conduit connecting said upper chamber to the boring machine and a passage connecting it to said lower chamber, a nozzle for delivering liquid through said lower chamber for conveying the dust to a delivery zone, a further nozzle coaxial with and into which said liquid delivery nozzle delivers its liquid, liquid pressure operated means for rotating said further nozzle, scrapers carried by said rotating nozzle for removing dust from the liquid delivery nozzle and the interior of said lower chamber, and a stationary scraper carried by said water delivering nozzle adapted to remove sediment from said scrapers carried by said rotating nozzle.

6. In dust exhausting apparatus for use with boring machines an upper dust receiving chamber, a further chamber located beneath said upper chamber and communicating therewith, a conduit adapted to connect said upper chamber to a boring machine, a nozzle depending axially into the lower of said chambers and ejecting liquid therein, a rotatable guide nozzle in the base of and depending from the said lower chamber, and a number of scrapers located within said lower chamber adapted to remove dust adhering thereto, a sieve in said upper chamber, a depending conduit alongside said chambers down which the coarser particles of dust fall, a discharge outlet in the lower end of said depending conduit and means for automatically opening and closing said outlet periodically.

7. In dust exhausting apparatus for use with boring machines a dust receiving chamber, a nozzle in said chamber for delivering liquid through said chamber for conveying the dust to a delivery zone, a further nozzle coaxial with and into which said liquid delivery nozzle delivers its liquid, means for rotating said further nozzle, a depending conduit alongside said chamber down which the coarser particles of dust fall, means for sorting the coarser particles from the finer particles before they enter said conduit and chamber, a discharge outlet in the lower end of said depending conduit, means operated from said rotating nozzle for opening said outlet, and a scraper carried by said rotating nozzle adapted to remove dust from the interior of said chamber.

8. In dust exhausting apparatus for use with boring machines a dust receiving chamber, a nozzle in said chamber for delivering liquid through said chamber for conveying the dust to a delivery zone, a further nozzle coaxial with and into which said liquid delivers its liquid, liquid pressure operated means for rotating said further nozzle, scrapers carried by said rotating nozzle for removing dust from the liquid delivery nozzle and said chamber, a stationary scraper carried by said water delivering nozzle adapted to remove sediment from said scrapers carried by said rotating nozzle, a sieve above said chamber, a depending conduit alongside said chamber down which the coarser particles of dust fall, a discharge outlet in the lower end of said depending conduit and means operated from said rotating nozzle for opening said outlet.

OTTO SCHREIBER.